Sept. 16, 1958　　　W. P. STRONG　　　2,852,085
ENGINE MOUNTING MEANS FOR MOTOR VEHICLES
Filed May 18, 1955　　　3 Sheets-Sheet 2
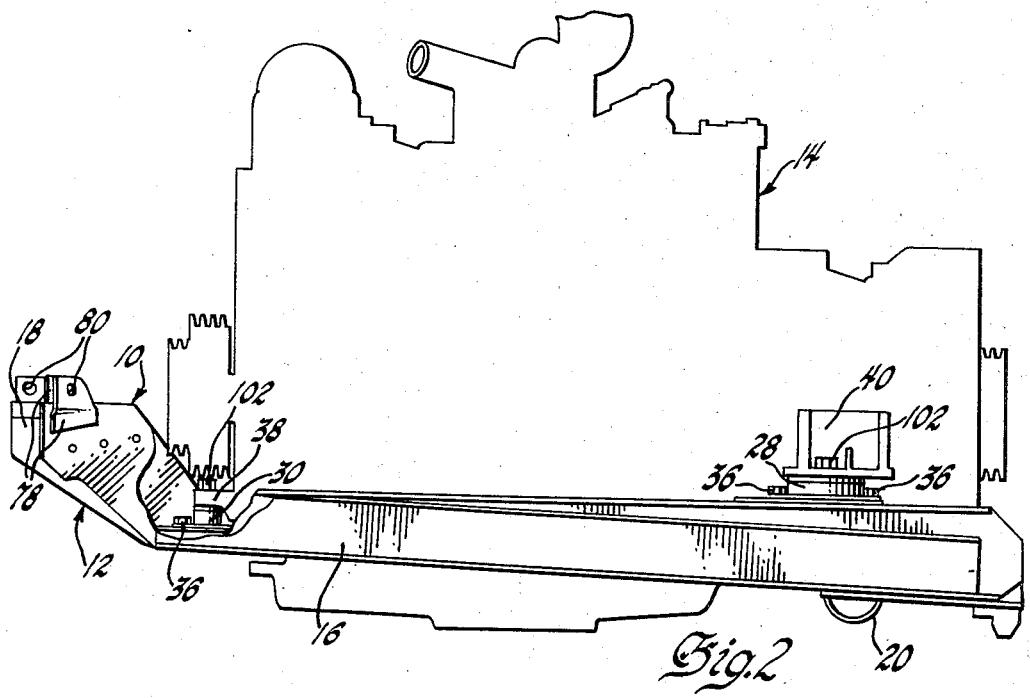
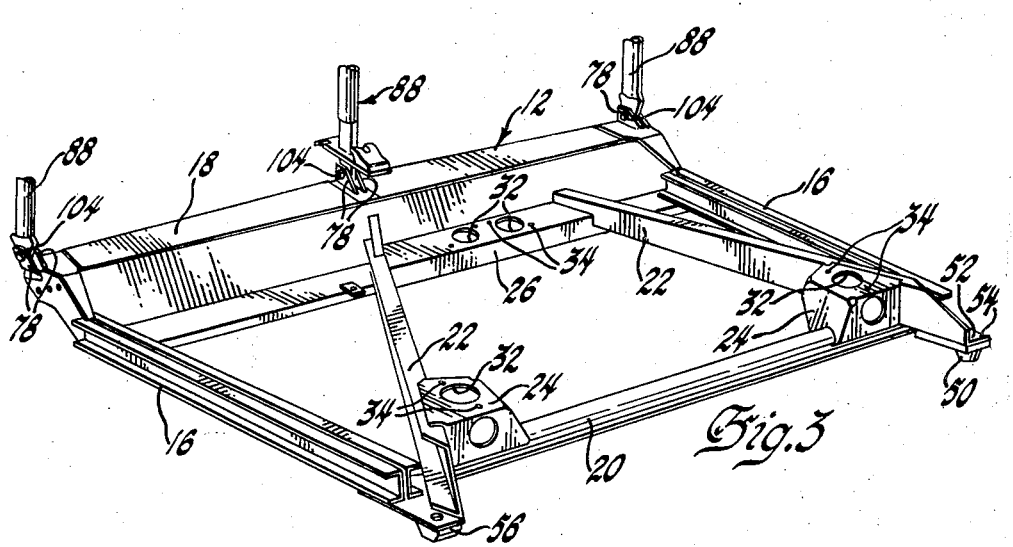
INVENTOR
William P. Strong
BY
L. D. Burek
ATTORNEY

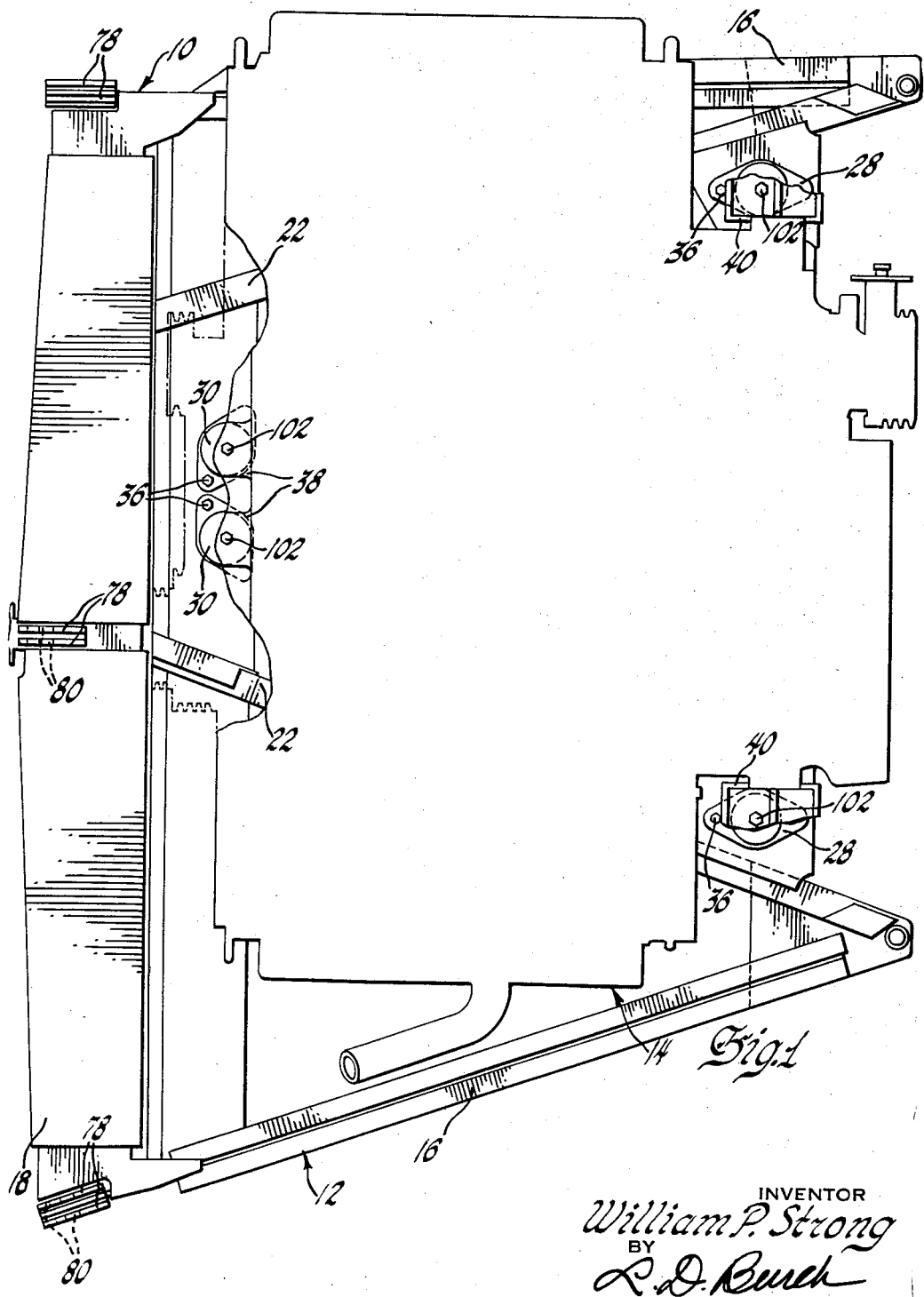

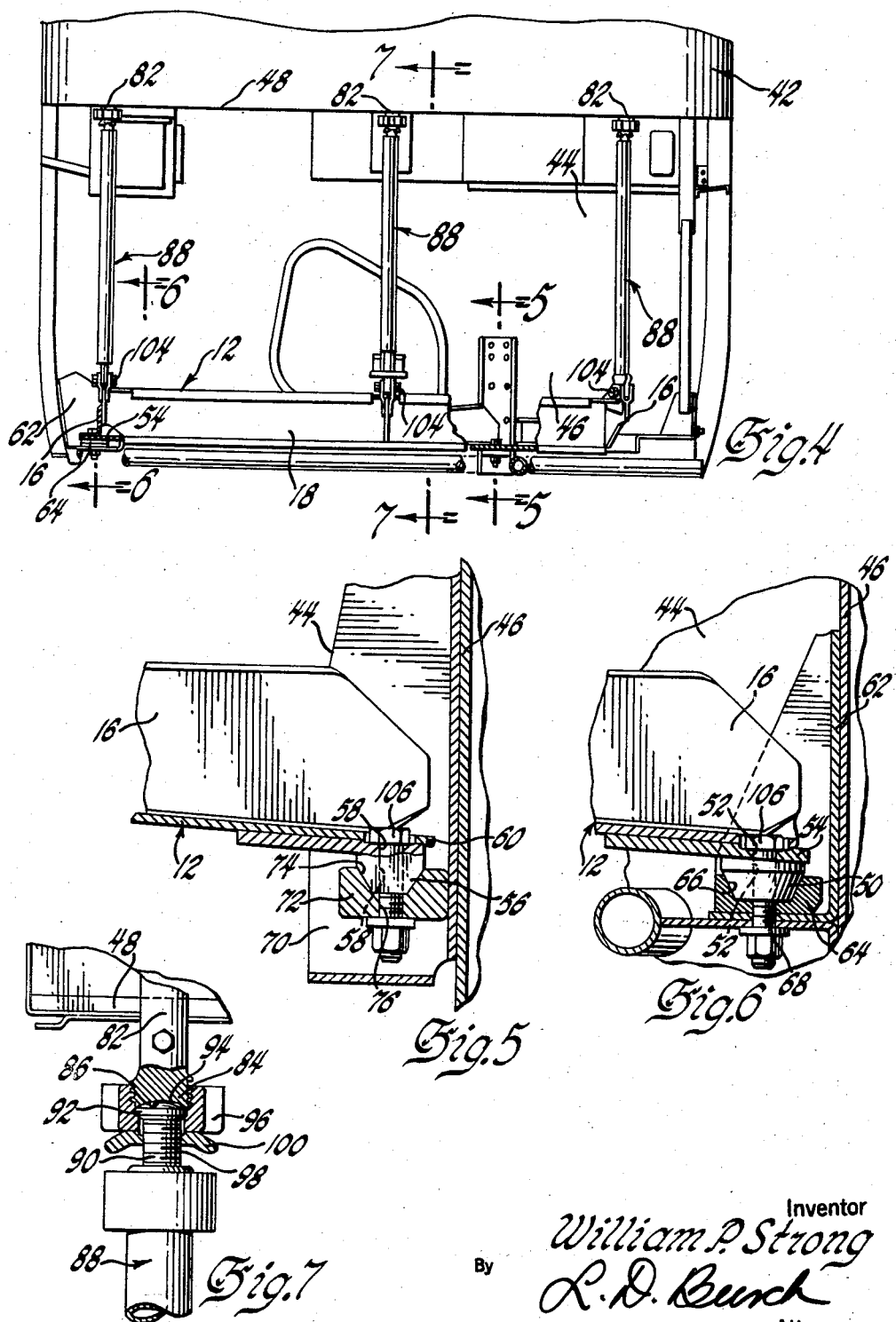

United States Patent Office 2,852,085
Patented Sept. 16, 1958

2,852,085

ENGINE MOUNTING MEANS FOR MOTOR VEHICLES

William P. Strong, Drayton Plains, Mich., assignor to General Motors Corporation, Detroit, Mich., a corporation of Delaware Application May 18, 1955, Serial No. 509,230

5 Claims. (Cl. 180—64)

This invention relates to motor vehicles, and more particularly to engine mounts for motor vehicles.

The usual method of mounting a vehicle engine is to secure it to the unitary vehicle frame by the use of resilient mounting units which prevent the transmitting of engine vibrations to the frame, and vice versa. While this method is suitable for mounting the engines of private passenger vehicles and the smaller commercial vehicles, it is not satisfactory for larger commercial vehicles such as buses and the like where the engine is comparatively large and requires frequent repair due to constant operation.

In case of buses, for instance, it is desirable to provide engine mounting means by which an engine in need of repair may be quickly removed from the vehicle and replaced by an engine ready for operation. In this manner, the vehicle itself will be out of use only for the very short period required to change an engine and not for the long time required to repair an engine, or the relatively long time to exchange engines with the use of present engine mounting means.

To this end, the invention contemplates the resilient mounting of the engine on a separate one-piece structural cradle member. While this mounting of the engine on the cradle is on the same order of permanence as present mounting of engines on vehicle frames, the cradle and engine assembly has quick positioning and quick fastening and release features by which it may be rigidly secured to the vehicle frame and made a virtual part thereof.

More specifically, the cradle and engine assembly is positioned by placing a conical member at one corner of the cradle into a conical socket in the vehicle frame; this accurately locates this corner of the cradle transversely and longitudinally of the vehicle. The cradle may then be swung into final position so that a wedge block at the opposite corner of the cradle may be placed in a wedge slot in the vehicle frame; this finally locates the cradle, except for its vertical position. The opposite end of the cradle is suspended from an overhead frame member by means of hangers pivoted on one end on the cradle and having quick connect threaded means at the other end. The cradle and engine assembly may be removed from the vehicle by reversing this procedure.

In the drawings:

Figure 1 is a top plan view of an engine and cradle assembly embodying the invention.

Figure 2 is a side elevational view of the assembly shown by Figure 1.

Figure 3 is a perspective view of the cradle shown by Figures 1 and 2.

Figure 4 is a fragmentary end elevational view with portions thereof cut away of a vehicle having the engine mount embodying the invention.

Figure 5 is a fragmentary cross-sectional view taken on the plan of line 5—5 of Figure 4 and looking in the direction of the arrows.

Figure 6 is a fragmentary cross-sectional view taken on the plane of line 6—6 of Figure 4 and looking in the direction of the arrows.

Figure 7 is a fragmentary cross-sectional view taken on the plane of line 7—7 of Figure 4 and looking in the direction of the arrows.

As already stated above, the invention contemplates resiliently mounting a vehicle engine on a structural member or cradle in the usual relatively permanent manner and then mounting the cradle and engine assembly on vehicle frame members in a manner so that the cradle becomes a part of the vehicle frame, but so that the engine and cradle assembly may be removed and a similar assembly substituted therefor with minimum time and effort.

Figures 1 and 2 illustrate the cradle and engine assembly 10, while Figure 3 illustrates the cradle 12 itself. It is apparent that the particular design of the engine 14 is not critical and that the cradle 12 may be said to comprise a structural member which will be designed to accommodate whatever engine is involved. Thus, the particular engine and cradle structure shown are illustrative only and are not intended in any way to limit the invention.

From Figure 3 it may be seen that the cradle 12 includes generally a pair of side members 16, a rear end member 18 and a front end member 20. Diagonal braces 22 may also be provided to strengthen the cradle. Although some of these members are illustrated as channel sections or tubular sections, other commercially available structural sections may just as well be employed and the particular arrangement of these sections may be varied to suit the engine.

A pair of front supports 24 and a single rear support 26 for conventional resilient engine mounting units 28 and 30 may be provided, with the supports 24 and 26 having apertures 32 to receive the mounting units 28 and 30 and holes 34 to receive threaded or other fasteners 36 for securing the mounting units. The positions of the supports 24 and 26 may be varied to arrange the mounting units 28 and 30 in any desired manner, although the arrangement shown includes a pair of closely spaced rear units 30 and a pair of more widely spaced front mounting units 28. The engine 14 may be provided with any suitable brackets 38 and 40 by which the engine may be mounted in the usual manner to the cradle 12, as shown by Figures 1 and 2.

Before proceeding further with the structure of the cradle, reference is made to Figure 4 which for illustrative purposes only represents a fragmentary rear elevational view of a bus body 42. The particular body shown has a rear engine compartment 44 which from a side view would appear as a block cut out of the rear lower corner of the body 42 across the entire width thereof. The engine compartment 44 may thus be bounded at the front by an engine compartment bulkhead 46 and at the top, at least in part, by a rearwardly extending vehicle frame member 48 to which the bulkhead 46 may in some manner be secured. Thus, in some intermediate stage of completion of the bus body, the engine compartment may be opened at the sides, rear and bottom thereof.

Referring again to Figures 3 and 5, the cradle 12 has at one front corner thereof a frusto-conical member 50 having an axial passage 52 therein, with the axial passage extending through the corner portion 54 of the cradle to which the member is attached. It will be noted that the conical member 50 extends downwardly or away from the engine 14. At the opposite front corner of the cradle, there is provided a wedge block 56 which also extends downwardly and which has a similar passage 58 extending through the block 56 and through the corner portion 60 of the cradle.

Referring now to Figures 4, 5 and 6 it will be noted that the engine compartment bulkhead 46 has secured at the lower portion thereof a bracket 62 provided with a block 64 having a frusto-conical recess 66 adapted to receive the frusto-conical member 50 on the cradle; the bracket 62 and block 64 also have a passage 68 disposed axially with respect to the recess 66, as shown by Figure 6. As further illustrated by Figure 5, the bulkhead 46 is provided with a second bracket 70 spaced from the first bracket 62 a distance approximately equal to the width of the front of the cradle 12, and this second bracket 70 is provided with a block 72 having an elongated wedge slot 74 adapted to receive the wedge block 56. The block 72 having the wedge slot 74 is also provided with a passage 76.

The rear of the cradle 12 is provided with pairs of relatively closely spaced brackets 78 having aligned passages 80 therein, while the rear of the frame member 48 at the top of the engine compartment 44 is provided with spaced downwardly projecting members 82, each being threaded at the free ends thereof 84 and having a centrally located concave spherical seat 86. The spacing of the downwardly extending threaded members 82 corresponds to the spacing of the pairs of brackets 78 on the cradle.

Pivotally secured between each pair of brackets 78 on the cradle is a hanger member 88. These hanger members are each provided at the opposite end thereof with a projection 90 having a shoulder 92 and a convex spherical seat 94 adapted to be received in the concave spherical seat 86 of the downwardly projecting members 82. The shoulder 92 retains the securing nut 96, and the projection is threaded at 98 below the shoulder 92 to provide means for tightening the lock nut 100. When the lock nut 100 is backed off, the securing nut 96 is free to move axially on the projection 90 without engaging the threads 98.

The use of the invention provides a very quick and easy method of mounting the engine 14 on the vehicle 42.

Starting with the engine cradle 12, for instance, suitable front and rear engine mounting units 28 and 30 of conventional design may be secured thereto in engine receiving position by means such as bolts 36, as shown by Figures 1 and 2. The engine 14 may then be properly located with respect to the cradle 12 and the mounting units 28 and 30 so that means such as 102 bolts may be employed to secure the engine 14 on the mounting units. Thus, the engine and cradle comprise a relatively permanent and compact assembly 10 which may be moved about as a unit without harming the engine.

Next, a hanger member 88 may be pivotally secured between each pair of brackets 78 by means of the pin 104 which may be attached in a suitable manner to lock it in the pivot passages 80. The cradle and engine assembly 10 having the hangers 88 pivotally secured thereto is now ready for assembly on the vehicle 42 in a manner so that the cradle 12 will become an integral part of the vehicle frame.

This is accomplished by placing the frusto-conical member 50 on the cradle 12 into the block 64 on the bulkhead 46 having the frusto-conical socket 66 so that one corner of the cradle 12 may be accurately located both horizontally and vertically. The cradle 12 may then be rotated on the frusto-conical member 50 as a pivot point until the wedge block 56 on the cradle may be inserted into the wedge slot 74. Since the wedge slot 74 is longer than the wedge block 56, any slight transverse misalignment thereof on installation will not prevent insertion of the wedge block 56 therein. This finally locates the other corner of the cradle 12 both horizontally and vertically and positions the cradle itself both transversely and longitudinally of the frame. The individual hanger members 88 may then each be raised so that the convex spherical seat 94 thereof may be received in the concave spherical seat 86 on the downwardly projecting members 82 on the vehicle frame 48. The securing nuts 96 may be tightened on the threaded end 84 of the downwardly projecting members 82 and fixed by means of the lock nuts 100. Bolt means 106 may now be employed to secure the cone and wedge block members 50 and 56 to the bulkhead 46.

It is apparent that with this procedure the cradle 12 may be rigidly secured to the vehicle frame so that it actually constitutes a part of the frame, and all vibrations of the engine 14 are thus transmitted directly to the vehicle frame.

The entire structure may of course be disassembled by the reverse steps, and in case of engine breakdown, an entire new engine and cradle assembly may be easily and quickly substituted.

What is claimed is:

1. Engine mounting means for use with a vehicle having an engine compartment which includes a bulkhead and a frame member extending over and beyond said bulkhead, said mounting means including an engine supporting member, means provided upon said bulkhead and disposed to receive and vertically locate one end of said engine supporting member, means provided at one forward corner of said engine supporting member and registering with one of said receiving means for the initial pivotal mounting of said supporting member within said engine compartment, wedge positioning means provided at the other forward corner of said engine supporting member and registering with the other of said receiving means for horizontally aligning said supporting member within said engine compartment, hanger means secured to said frame member and depending therefrom within said engine compartment, and means provided upon said other end of said engine supporting member for receiving and engaging said hangers to vertically locate said other end thereof within said engine compartment.

2. Engine mounting means for use with a vehicle having an engine compartment provided therein and which includes, a frame member extending over an end wall bulkhead of said engine compartment, an engine supporting member receivable within said compartment and in spaced relation below said frame member, means provided upon said bulkhead and having a conical depression and a wedge slot formed therein and disposed to receive and vertically locate one end of said engine supporting member, means provided at the end of said engine supporting member next adjacent said bulkhead and registered with said receiving means for locating said supporting member upon said bulkhead and relative thereto, hanger means secured to said frame member and depending therefrom within said engine compartment, and means provided upon said other end of said engine supporting member for receiving and engaging said hanger means to vertically locate said other end thereof within said engine compartment.

3. The engine mounting means of claim 2 wherein said means provided at the end of said engine supporting member next adjacent said bulkhead includes members disposed at opposite end corners thereof and cooperating with said receiving means for horizontally aligning said supporting member within said engine compartment and stabilizing said supporting member against retrograde shifting.

4. In an engine driven vehicle, a separate one-piece cradle adapted to have mounted thereon the engine for said vehicle, said cradle comprising spaced transverse and a longitudinal cradle locating means and rear support means, said cradle being forwardly supported on the bulkhead of the engine compartment by said locating means, one of said locating means including a cone on said cradle receivable in a conical socket on said bulkhead and the other of said means including a wedge block receivable in a wedge slot on said bulkhead, said wedge slot being longer than said block.

5. In an engine driven vehicle, a separate one-piece cradle adapted to have mounted thereon the engine for said vehicle, said cradle comprising spaced transverse and a longitudinal cradle locating means and rear support means, said cradle being forwardly supported on the bulkhead of the engine compartment by said locating means, one of said locating means including a cone on said cradle receivable in a conical socket on said bulkhead and the other of said means including a wedge block receivable in a wedge slot on said bulkhead.

References Cited in the file of this patent

UNITED STATES PATENTS

| | | |
|---|---|---|
| 2,038,581 | Lent | Apr. 28, 1936 |
| 2,196,428 | Saurer | Apr. 9, 1940 |
| 2,235,175 | Simpkins et al. | Mar. 18, 1941 |

OTHER REFERENCES

| | | |
|---|---|---|
| 103,659 | Australia | Apr. 28, 1938 |
| 11,726 | Great Britain | A. D. 1908 |
| 415,149 | Italy | Sept. 28, 1946 |